United States Patent [19]

Kanno

[11] Patent Number: 4,729,047
[45] Date of Patent: Mar. 1, 1988

[54] DISK DRIVING DEVICE FOR A DISK CARTRIDGE

[75] Inventor: Tetsuo Kanno, Ebina, Japan

[73] Assignee: Ricoh Company, Ltd., Tokyo, Japan

[21] Appl. No.: 797,906

[22] Filed: Nov. 14, 1985

[30] Foreign Application Priority Data

| Nov. 14, 1984 | [JP] | Japan | 59-171736 |
| Nov. 20, 1984 | [JP] | Japan | 59-175794 |
| Nov. 20, 1984 | [JP] | Japan | 59-244835 |
| Nov. 27, 1984 | [JP] | Japan | 59-179776 |
| Nov. 27, 1984 | [JP] | Japan | 59-249965 |

[51] Int. Cl.$^4$ ............ G11B 17/02; G11B 17/04; G11B 5/012
[52] U.S. Cl. ............ 360/97; 360/99; 360/133; 369/271
[58] Field of Search ............ 360/97-99; 369/270-271

[56] References Cited

U.S. PATENT DOCUMENTS

| 4,562,498 | 12/1985 | Shibatu | 360/97 X |
| 4,570,195 | 2/1986 | Shimaoka et al. | 360/97 X |
| 4,647,996 | 3/1987 | Shimaoka et al. | 360/97 X |

*Primary Examiner*—John H. Wolff
*Assistant Examiner*—Alfonso Garcia
*Attorney, Agent, or Firm*—Oblon, Fisher, Spivak, McClelland & Maier

[57] ABSTRACT

A disk driving device includes a cartridge holder for accommodating a disk cartridge. Guide rollers associated with the cartridge holder are each guided by a guide slot to move the cartridge holder so as to load the disk cartridge in the device. The device includes a mechanism for preventing information from being unwantedly written into the disk which is encased in the disk cartridge.

3 Claims, 19 Drawing Figures

DISK DRIVING DEVICE FOR A DISK CARTRIDGE

BACKGROUND OF THE INVENTION

1. Field of the Invention

The present invention relates to a disk driving device for writing information in and reading it out of a floppy disk or a hard disk which is encased in a disk cartridge and loaded in the device. More particularly, the present invention is concerned with a mechanism inclusive of a cartridge holder for loading a disk cartridge in such a disk driving device, a mechanism for sensing a position of the disk cartridge loaded in the device and, based on the sensed position, inhibiting an inadequate writing in the disk to prevent information stored in the disk from being carelessly erased, and a mechanism for mounting a belt to a slidable member which carries a head therewith for driving the slidable member.

2. Description of the Prior Art

A disk cartridge loading mechanism which includes a cartridge holder and has heretofore been built in a disk driving device of the type described is made up of a great number of structural elements, so that assembly is troublesome, the cost is high, and operation thereof is unstable. Also, a prior art mechanism for preventing inadequate or careless erasure is implemented with a prohibitive number of parts and such is therefore, expensive. Further, a prior art belt mounting structure associated with a slide member has the drawback that it is incapable of allowing the slide member to smoothly reciprocate along a rectilinear path and, therefore incapable of accurately positioning the slide member.

SUMMARY OF THE INVENTION

It is therefore an object of the present invention to provide an improved cartridge holder for a disk driving device which can be implemented with a small number of parts and produced with ease and at low cost.

It is another object of the present invention to provide an improved cartridge loading mechanism for a disk driving device which also can be implemented with a small number of parts and produced with ease and at low cost and, in addition, achieves stability and reliability of operation.

It is another object of the present invention to provide an improved careless erasure preventing mechanism for a disk driving device which, when detecting a disk cartridge in an unerasable position inside of the device by means of a sensor mechanism which is built in the device, prevents information to be written in a disk of the disk cartridge.

It is another object of the present invention to provide a new and useful structure for mounting a belt to a slide member, which carries a head therewith, for driving the belt in a disk driving device.

It is another object of the present invention to provide a generally improved disk driving device.

In accordance with one aspect of the present invention, there is provided a disk driving device for causing information to be written into and read out of a disk cartridge when the disk cartridge is loaded in a body of the device, comprising a cartridge holder provided with one opening and two guide rollers at each of opposite sides thereof for admitting the disk cartridge thereinto, a base member on which guide pins which respectively are inserted in the openings of the cartridge holder are positioned upright, and a slide plate slidable constantly biased in a direction opposite to an intended direction of insertion of the disk cartridge. The slide plate is formed with guide slots at opposite side thereof in which the rollers are engaged in one-to-one correspondence for supporting the cartridge holder. Each of the guide slots has a first portion, a second portion positioned ahead of the first portion with respect to the intended direction of insertion of the disk cartridge and lower than the first portion in level, and a slanted member connecting the first and second portions to each other. The device further comprises a latch provided on the base member for, when the slide base is moved in the intended direction of insertion of the disk cartridge, latching the slide plate to prevent the slide plate against the bias from returning and, when the disk cartridge is inserted into the cartridge holder, unlatching the slide plate.

In accordance with another aspect of the present invention, there is provided a belt mounting structure for a motion converting device which uses a belt having a comparatively wide portion, which is formed with an elongate slot at an intermediate portion thereof, and a comparatively narrow tongue-like portion extending from one end of the wide portion, a free end of the narrow portion being passed through the slot of the wide portion to form a loop which is fit over an outer periphery of a roller and rigidly connected to the roller, opposite ends of the belt being fixed to a slide member, a reciprocal rotary motion of the roller which is driven by a motor being converted to a reciprocal rectilinear motion of the slide member, wherein an arm is provided integrally with the wide portion adjacent to a free end of the wide portion to extend along the slot of the wide portion, the arm being bent to accommodate the roller and being engaged with the side member at an end of the arm to be prevented from rotating, the free end of the wide portion of the belt being fastened to the slide member by a screw.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

While the disk driving device of the present invention is susceptible of numerous physical embodiments, depending upon the environment and requirements of use, substantial numbers of the same being shown herein and described embodiments have been made, tested and used, and all have performed in an eminently satisfactory manner.

To better understand the present invention, a brief reference will be made to various prior art mechanisms associated with disk to which the present invention pertains, shown in FIGS. 1-6.

Figure 1:
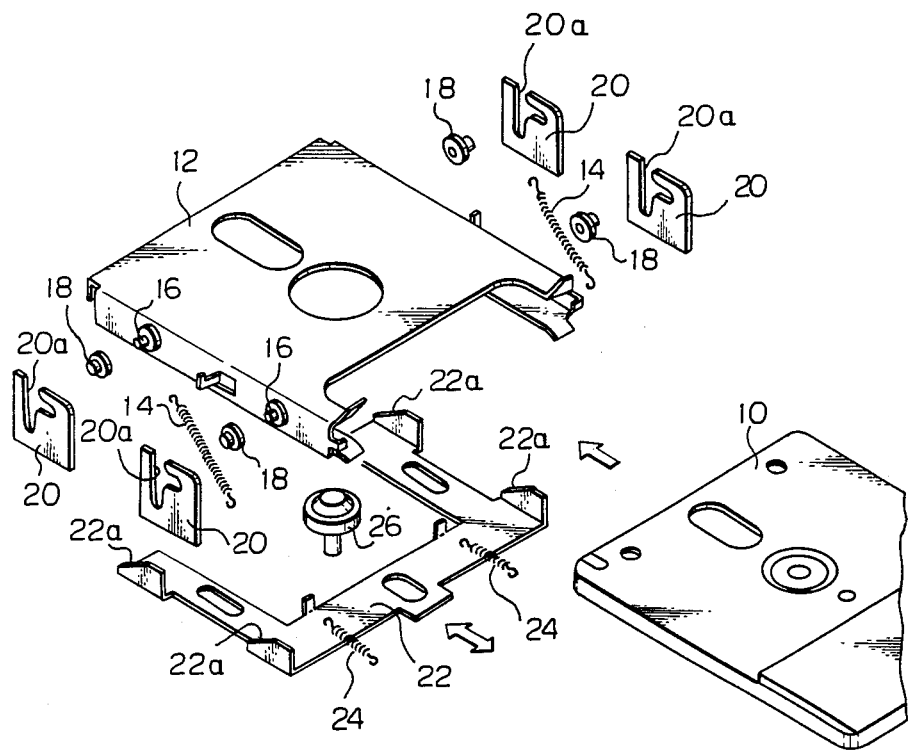
FIG. 1 is an exploded perspective view of a prior art disk cartridge loading mechanism.

Referring to FIG. 1, a disk cartridge loading mechanism known in the art is shown. A disk cartridge 10 is inserted into a cartridge holder 12 as indicated by an arrow in the drawing. A pair of tension springs 14 respectively are anchored at laterally opposite ends of the cartridge holder 12 at their one end, thereby constantly biasing the catridge holder 12 in a rightwardly downward direction as viewed in the drawing. Four lugs 16 extend from the cartridge holder 12, two from one side and two from the other side. Guide rollers 18 are rotatably coupled over the lugs 16 in one-to-one correspondence. Each of the guide rollers 18 is received in a generally T-shaped guide slot 20a which is formed through a guide plate 20, thereby supporting the cartridge holder 12. Meanwhile, the disk driving device includes a slide plate, or slider, 22 which is slidably positioned below the cartridge holder 112. Two tension springs 24 constantly bias the slider 22 in a direction opposite to the direction of cartridge insertion. The slider 22 is formed with slanted members 22a which correspond respectively with the lower portions of the slots 20a of the guide plates 20.

Figure 2A:
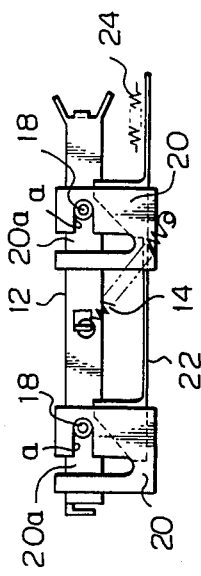
FIGS. 2A-2C shows the mechanism of FIG. 1 in three different operating positions.
Figure 2B:
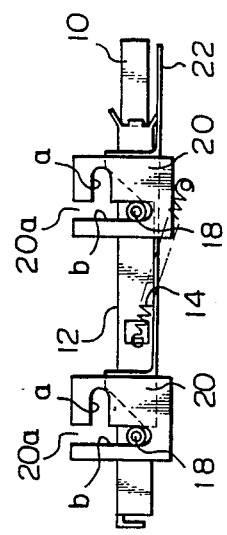
Figure 2C:
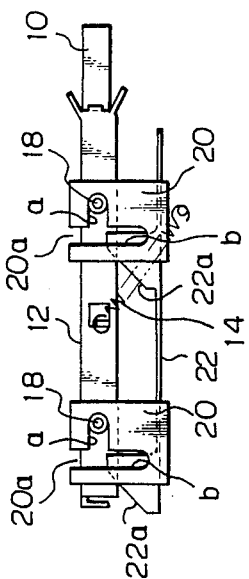
Figure 3:
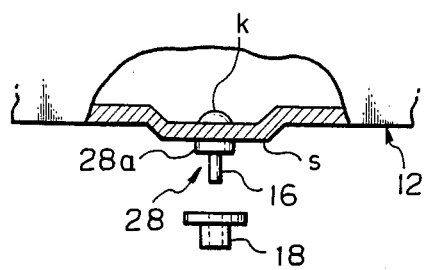
FIG. 3 is a partly taken away enlarged plan view of one of guide roller mounting portions included in the mechanism of FIG. 1.

As shown in FIG. 2A, before the disk cartridge 10 is loaded in the disk driving device, the guide rollers 18 remain in horizontal extensions a of their associated guide slots 20a and, therefore, the cartridge holder 12 is supported in a raised position. As the disk cartridge 10 is inserted into the cartridge holder 12 and pushed deeper into the latter, the guide rollers 18 individually roll along their associated horizontal slot extensions a and, in due course, drop in vertical extensions b of the slots 20a due to the action of the tension springs 14. As a result, the cartridge holder 12 is moved to a lowered position as shown in FIG. 2B. In this condition, a spindle 26 which is shown in FIG. 1 is engaged with a disk of the cartridge 10, so that the latter is positioned in the device. After desired information have been written in or read out of the disk, the slider 22 is manually pushed. Then, the slider 22 urges the guide rollers 18 upwardly along the vertical slot extensions b at their slanted members 22a until, due to the action of the springs 14, the guide rollers 18 are again shifted into the horizontal slot extensions a. Consequently, as shown in FIG. 2C, the cartridge holder 12 is brought back to the raised position to allow the disk cartridge 10 to be pulled out.

The problem with the above-described prior art loading mechanism is that the pair of tension springs 14, four guide plates 20 and others are essential and such the need for such a number of parts leads to troublesome assembly and disproportionate cost. In addition, since the horizontal movement of the cartridge holder 12 which occurs with the rollers 16 received in the horizontal slot extensions a is restricted by the guide plates 20, it is affected by the contact of the rollers 16 and the guide plates 20 to become unstable.

Other problems with the prior art loading mechanism described above are as follows. As shown in detail in FIG. 3, each of the lugs 16 of the cartridge holder 12 is provided by contracting the cartridge holder 12 at each position where the guide roller 18 is to be mounted to provide an outwardly extending contraction s and, then, fixing a metal pin 28 to the contraction s. The pin 28 has a flange 28a at its intermediate portion and extends throughout the side wall of cartridge holder 12, the innermost end of the pin 28 being crimped along the edge. The outwardly extending portion of the pin 28 serves as the lug 16. The contraction s serves to prevent the crimped potion k of the pin 28 from protruding into the path of the disk cartridge 10 inside of the cartridge holder 12. In this manner, the prior art cartridge holder 12 requires the contraction s at all positions of its side walls where the guide rollers 18 are to be mounted, and the metal pins 28 in all such contractions s. Moreover, the metal pins 28 have to be shaped by turning and, in addition, crimped along the edge to be fixed to the cartridge holder 12. For these reasons, the prior art cartridge holder 12 requires complicated machining steps which therefore adds to the production cost of the whole device.

Figure 4:
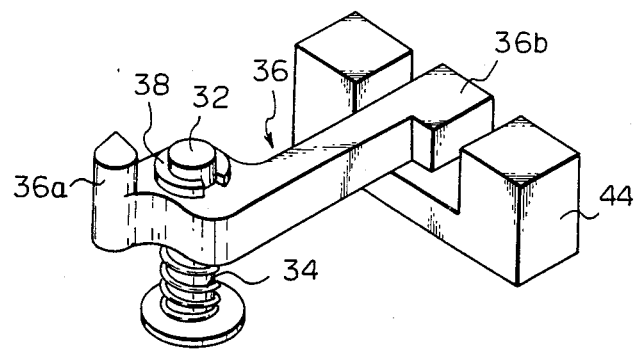
FIG. 4 is a perspective view of a careless erasure preventing mechanism of a prior art disk driving device.
Figure 5:
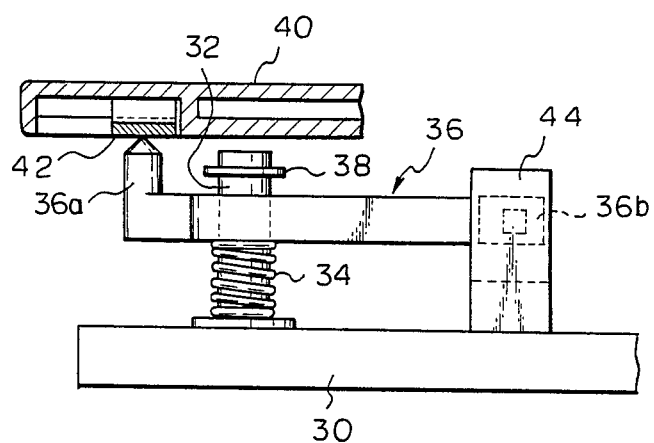
FIG. 5 shows the mechanism of FIG. 4 in a particular operating position.

Referring to FIGS. 4 and 5, an inadequate or careless erasure preventing mechanism known in the art is shown. The mechanism includes a base member 30 on which a guide shaft 32 is provided in an upright position. A compression spring 34 is coupled over the guide shaft 32 and, then, a sensing member 36 compressing the spring 34. An E-ring 38 is fit on the upper end of the guide shaft 32 to prevent the sensing member 36 from slipping out of the guide shaft 32. The sensing member 36 has an upright extension 36a at one end thereof and a shutter portion 36b at the other end. A disk cartridge 40, on the other hand, is provided with a switch member 42 which is movable between an erasable and a non-erasable position.

As shown in FIG. 5, as the disk cartridge 40 is loaded in the disk driving device with the switch member 42 held in the erasable position, the switch member 42 abuts against the tip of the upright extension 36a of the sensing member 36 and, thereby presses the member 36 downwardly against the force of the spring 34. This moves the shutter portion 36b into a sensor 44 so that a light-emitting element and a light-sensitive element which, although not shown, are arranged in the sensor to face each other are optically isolated from each other. As a result, the output level of the light-sensitive element is lowered to enable the device to write information. When the disk cartridge 40 is loaded with the switch 42 shifted to the non-erasable position, the switch member 42 does not make contact with the upright extension 36a. In this condition, the extension 36a enters the disk cartridge 40 through an opening of the latter so that the sensing member 36 is not lowered, holding the shutter portion 36b positioned outside of the sensor 44. This prevents the disk driving device from writing information into the disk. Again, this kind of careless erasure preventing mechanism requires many parts for sensing a position of the switch member 42, i.e. guide shaft 32, compression spring 34, sensing member 42 and E-ring.

Figure 6:
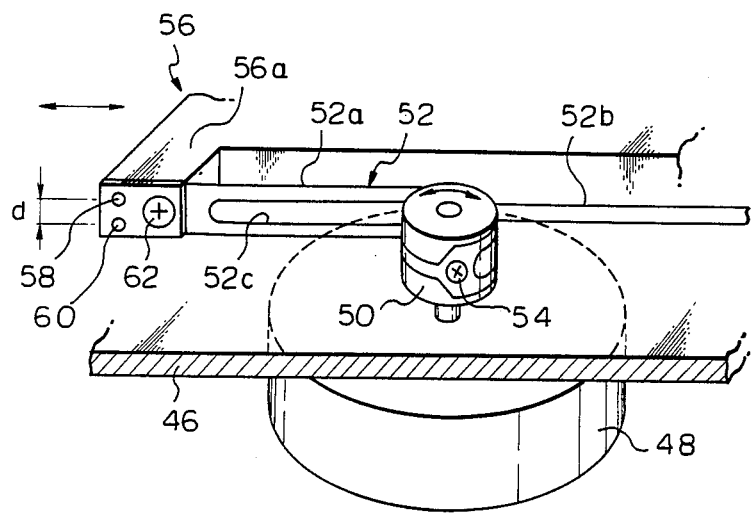
FIG. 6 is a perspective view of a motion converting device of a prior art belt mounting structure.

A floppy disk driving device, for example, has customarily used a motion converting arrangement such as shown in FIG. 6. The arrangement of FIG. 6 includes a stepping motor 48 which is fixed to a base member 46. A roller 50 is mounted on an output shaft of the stepping motor 48. A belt 52 is wound around the roller 50. Specifically, the belt 52 has a comparatively wide portion 52a and a comparatively narrow portion 52b. The wide portion 52b is formed with a slot 52c intermediate between its opposite ends, while the free end of the narrow portion 52b is passed through the slot 52c to form a loop. This loop of the belt 52 is fit over the roller 50 and rigidly connected to the latter by a screw 54. Opposite ends of the belt 52 are fastened to a slide member 56 which carries a magnetic head, not shown. In this construction, as the roller 50 is rotated by the stepping motor 48 in either direction as indicated by an arrow, the reciprocal rotational motion is converted to a reciprocal rectilinear motion of the slide member 56 as indicated by an arrow, which moves the magnet head. At the end of the wide portion 52a, for example, the belt 52 is fixed to the slide member 56 by inserting guide pins 58 and 60, which extend from a projection 56a of the slider 56, into apertures formed through the belt 52 and, then, fastening the so positioned belt end to the slider 56 by means of a screw 62.

The problem with the above-described type of motion converting device is that the distance d between the two guide pins 58 and 60 has to be designed extremely short in order to meet the current trend toward a smaller device configuration. A short distance d undesirably causes the belt 52 to twist and deform when the screw 62 is driven. Such may allow the wide portion 52a and narrow portion 52b of the belt 52 to rub each other to thereby obstruct smooth rectilinear motion of the slide member 56, while reducing the positioning accuracy of the slide member 56.

Preferred embodiments of the present invention which are free from the drawbacks particular to the prior art techniques as discussed above will hereinafter be described with reference to the accompanying drawings.

Figure 7:
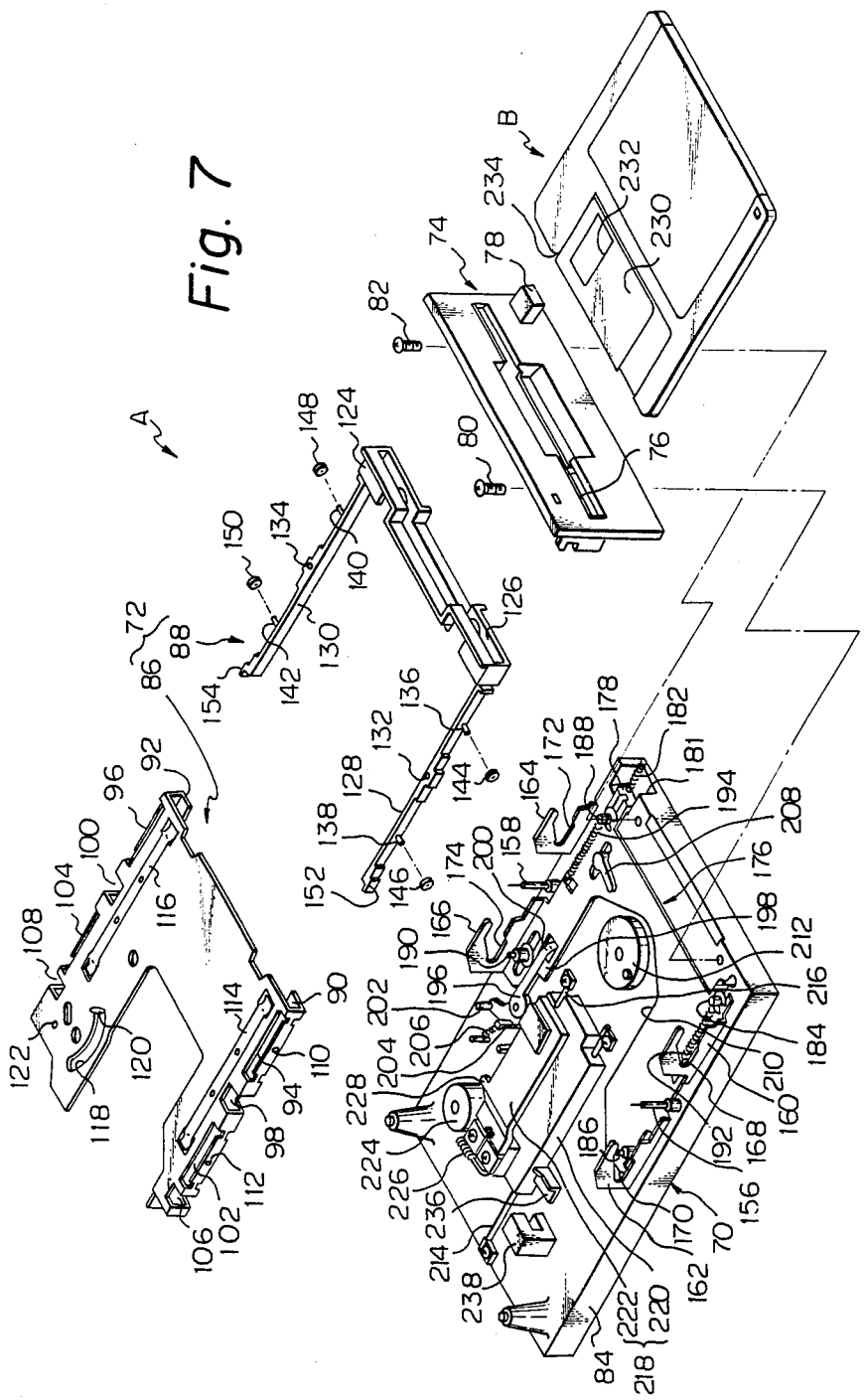
FIG. 7 is an exploded perspective view of a floppy disk driving device to which the present invention is applied.

Referring now to FIG. 7, a floppy disk driving device in accordance with the present invention is shown. The device comprises a body A having a body section 70, a cartridge holder 72 mounted on the body section 70, and a front frame 74 located at the front end of the body A. A disk cartridge to be loaded in the body A is designated by the reference character B. For clarity, body A shall be referred to as the device A and the body section 70 shall be referred to as the body 70.

The front frame 74 is formed with a horizontally extending slot 76 for the insertion of the disk cartridge B. An eject button 78 for ejecting the disk cartridge B out of the body, or device, A is positioned in a lower right portion of the front frame 74. The front frame 74 is fastened to a base member 84 of the body 70 by screws 80 and 82.

As shown in FIG. 7, the cartridge holder 72 comprises a metal frame 86 and a media or cartridge guide 88 which is made of resin and received in the frame 86. Specifically, the frame 86 is bent in a U shape along its opposite sides and toward the back to form a pair of guide edge portions 90 and 92. The guide edge portions 90 and 92 respectively are provided with slots 94 and 96, intermediate openings 98 and 100, slots 102 and 104, and front openings 106 and 108 each at laterally aligned positions. Openings 110 and 112 are formed through both sides of the frame 86 adjacent to the slots 94 and 96 and the slots 102 and 104. Retainer springs 114 and 116 respectively are arranged on opposite sides of the upper surface of the frame 86 along the guide edge portions 90 and 92. Each of the retainer springs 114 is rigidly connected to the upper surface of the frame 86 at its intermediate portion, while being passed through windows of the frame 86 at opposite ends so as to retain the disk cartridge B when the latter is loaded in the frame 86. The frame 86 is further provided with an arcuate slot 118 at one side of its front end portion. An eject arm 120 is rotatable about a stub 122 on the underside of the frame 86 and received in the arcuate slot 118 at its upper end. The eject arm 120 is constantly biased in the counterclockwise direction as viewed in FIG. 7.

Figure 8:
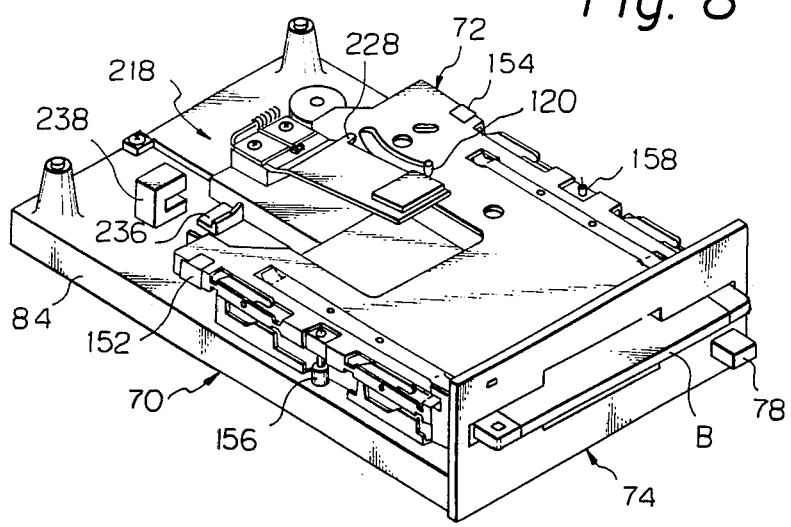
FIG. 8 is a perspective view of the device of FIG. 7 in which a disk cartridge is being inserted.
Figure 9:
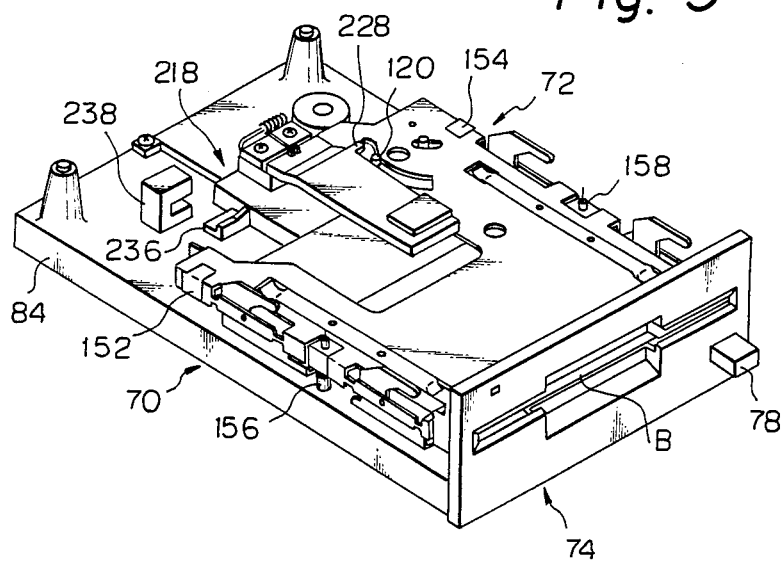
FIG. 9 is a view similar to FIG. 8 but showing the device with the disk cartridge fully inserted therein.

Meanwhile, the media guide 88 is provided with a frame portion 124 at the rear end thereof with respect to the direction of insertion of the disk cartridge B. The frame portion 124 is formed with a slot 126 through which the cartridge B is movable into and out of the media guide 88. A pair of parallel guide arms 128 and 130 extend forwardly from opposite ends of the frame portion 124 and each includes a thickened portion. The thickened portions of the guide arms 128 and 130 are formed with through bores 132 and 134, respectively. Lugs, or stubs, 136 and 138 extend outwardly from the guide arm 128 at longitudinally opposite sides of the through bore 132. Likewise, lugs 140 and 142 extend outwardly from the other guide arm 130 at opposite sides of the through bore 134. Guide rollers 144, 146, 148 and 150 are rotatably mounted on the lugs 136, 138, 140 and 142, respectively. The guide arms 128 and 130 respectively are inserted into the guide edge portions 90 and 92 of the frame 86 and, as shown in FIGS. 8 and 9, anchored at their shaped free ends to the front openings 106 and 108, thereby fixing the media guide 88 in place relative to the frame 86. In this position, the through bores 132 and 134 of the guide arms 128 and 130 respectively are located in the intermediate openings 98 and 100 of the frame 86, and the guide rollers 144, 146, 148 and 150 in the slots 94, 96, 102 and 104.

The cartridge holder 72 having the above construction is mounted to the body 70 by inserting guide pins 156 and 158 into the through bores 132 and 134, respectively, and positioning the guide rollers 144, 146, 148 and 150 in guide slots 168, 170, 172 and 174 of guide portions 160, 162, 164 and 166, respectively. This positions the slot 126 of the media guide 88 in alignment with the slot 76 of the front frame 74. A slide plate, or slider, 176 is slidably mounted on the base member 84 of the body 70 which comprises a die-casting. The slider 176 is upwardly bent at opposite sides thereof to form the previously mentioned guide portions 160, 162, 164 and 166 in laterally aligned positions. The guide portions 160, 162, 164 and 166 are formed with guide slots 168, 170, 172 and 174 each of which has a stepped lower edge. Specifically, as shown in FIG. 7, the lower edge of each of the guide portions 160-166 is made up of a upper part, a lower part upstream of the upper part with respect to the direction of cartridge insertion, and a slanted member which connects the upper and lower parts to each other. A downwardly bent portion 178 of the slider 176, which is visible in a right portion of the slider 176 in FIG. 7, is received in a recess 180 of the base member 84. A compression spring 182 intervenes between the bent portion 178 and the eject button 78, which also protrudes into the recess 180. Guided by four guide pins 184, 186, 188 and 190, the slider 176 is slidable longitudinally of the device while being prevented from moving upward. Usually, the slider 176 is biased by tension springs 192 and 194 rearwardly with respect to the direction of cartridge insertion and retained by a latch 196. As shown, the latch 196 has at one end thereof a pawl 200 which is engageable with a pawl 198 of the slider 176 and, at the other end, projections 202 and 204 for purposes which will be described. The latch 196 is constantly biased by a tension spring 206 clockwise as viewed in the drawing. The reference numeral 208 designates an oil damper adapted to regulate, or brake, the movement of the slider 176.

The guide pins 156 and 158 are positioned upright on the base member 86 at opposite sides of the slider 176 and between the guide portions 160 and 164 and between the guide portions 162 an 166, respectively. The slider 176 has its central part removed to form a notch 210 through which a spindle 212 on the base member 176 extends. The spindle 212 is driven by a motor (not shown) which is mounted on the base member 84, so as to rotate a floppy disk of the disk cartridge B when the latter is loaded in the device A. A carriage 218 is mounted on the base member 178 and guided by guide shafts 214 and 216 to be reciprocally movable along a rectilinear path. The carriage 218 is made up of a slidable member 220, and a rotatable member 222. The rotation of a roller 224 is transmitted by a belt (not shown) to the slidable member 220 so that the member 220 is movable forwardly and rearwardly guided by the guide shafts 214 and 216. The rotatable member 222, on the other hand, is rotatably mounted to the slidable member 220 through a leaf spring and constantly biased downwardly by a spring 226 toward the member 220. Usually, the rotatable member 222 remains stationary with its lug 228 abutting against the upper surface of the frame 86. A magnetic head (not shown) is mounted in each of the corresponding positions of the slidable member 222 and rotatable member 222, so that information may be written into or read out of the floppy disk of the disk cartridge B. The roller 224 is reciprocally rotated by a stepping motor (not shown) which is mounted on the base member 84.

A slide cover 230 is laterally slidably fit over the end portion of the disk cartridge B. Specifically, the slide cover 230 extends from the front to the back of the disk cartridge B by way of the front edge and is slidable to the right and left in the drawing, although constantly biased in one direction. The slide cover 230 is formed with windows 232 which are aligned with each other at the front and the back, the windows 232 being usually closed. At the slide cover 230 is moved in the other direction against the bias, the windows 232 will be opened to allow the floppy disk to show itself therethrough. In operation, when the disk cartridge B is inserted into the device A through the slot 76 of the front frame 74, it moves through the slot 126 of the media guide 88 into the cartridge holder 72. The cartridge B, moving deeper into the cartridge holder 72 guided by the guide arms 128 and 130, abuts against the eject arm 120 at its front edge, as shown in FIG. 8.

As the cartridge B is pushed further deeper into the device A, it such urges the eject arm 120 clockwise in the drawing against the tendency of the latter. At the same time, the eject arm 120 is brought into engagement with a notch 234 which is formed at the front end of the cartridge B, thereby moving the slide cover 230 against the biasing force acting on the latter. As soon as the slide cover 230 reaches a substantially open condition, the front end of the cartridge B abuts against the projection 202 of the latch 196 to rotate the latch 196 counterclockwise against the action of the tension spring 206. Then, the pawl 198 is released from the pawl 200 so that the slider 176 is pulled by the springs 192 and 194 rearwardly with respect to the direction of cartridge insertion and moved until it abuts against a stop while being decelerated by the oil damper 208. Due to such movement of the slider 176, the slants of the guide slots 168, 179, 172 and 174 of guide portions 160, 162, 164 and 166 press the associated guide rollers 144, 146, 148 and 150 downwardly, with the result that the cartridge holder 72 is lowered guided by the guide pins 156 and 158. The cartridge holder 72, too, is lowered slowly by virtue of the function of the oil damper 208. Then, a metal core of the floppy disk inside the cartridge B is magnetically attracted by a magnet of the spindle 212. At the same time, due to the downward movement of the cartridge holder 72, the rotatable member 222 is lowered to bring the magnetic head into contact with the floppy disk through the window 232, as shown in FIG. 9. The projection 204 of the latch 196 abuts against the eject arm 120 to prevent it from moving in the backward direction. As the cartridge B is positioned as described, a signal indicative of it is produced to drive the motor so that the spindle 212 is engaged with the floppy disk to rotate it. Responsive to a restore signal, the stepping motor is energized to return the carriage 218 toward a reference track. When a shutter arm 236 which is integral with the slide member 220 has become aligned with a photointerrupter 238 on the base member 84, movement of the carriage 218 is stopped so that the magnetic head is accurately positioned at the reference track. Thereafter, the magnetic head may be moved by the stepping motor to a desired track of the floppy disk for reading or writing information.

When the cartridge B is loaded in the device A as described above, the frame portion 124 of the media guide 88 covers the slot 126 of the front frame 74 due to downward movement of the cartridge holder 72. This is effective to conceal the interior of the device A from the outside and, thereby, preserve favorable appearance.

To remove the disk cartridge B from the device A after the desired operation, the operator depresses the eject button 78. Then, the slider 176 is moved against the action of the tension springs 192 and 194 causing the slants of the guide slots 168, 170, 172 and 174 of the guide portions to urge the guide rollers 144, 146, 148 and 150, with the result that the cartridge holder 72 is moved upwardly guided by the guide pins 156 and 158. The upward movement of the cartridge holder 72 causes the floppy disk and the spindle 212 to be released from each other. At the same time, the rotable member 222 is raised to move the magnetic head clear of the floppy disk. At this instant, the eject arm 120 and the projection 204 of the latch 196 are substantially released from each other. As the eject button 78 is further depressed, the pawl 198 is brought into engagement with the pawl 200 to slightly move the latch 196 clockwise in FIG. 7. As a result, the rotatable member 222 is moved upwardly to in turn move the magnetic head away from the floppy disk. Further, the eject arm 120 and the projection 204 become substantially disengaged from each other. As the eject button 78 is depressed more deeply into the device A, the pawl 200 catches the pawl 198 to slightly move the latch 196 clockwise in the drawing, thereby fully releasing the eject arm 120 from the latch 196. Then, the eject arm 120 rotates counterclockwise due to its own tendency to eject the cartridge B. In this condition, the operator may take the cartridge B out of the device A.

As seen from the above, the present invention provides a disk driving device in which the disk cartridge B is inserted into the cartridge holder 72 of the device A and, after the cartridge holder 72 has been moved with the guide rollers 144, 146, 148 and 150 guided by the guide slots 168, 170, 172 and 174, loaded in a predetermined position inside of the apparatus A. The frame 86 is formed with the two openings 110 and 112 one through each side wall, while the media guide 88 made of resin is combined with the frame 86 at those opposite sides of the frame 86. The cartridge B is guided by the media guide 88 between the opposite sides of the latter. The lugs 136, 138, 140 and 142 with which the guide rollers 144, 146, 148 and 150 respectively are engageable extend outwardly from the media guide 88 and are received in the openings 110 and 112.

Figure 10:
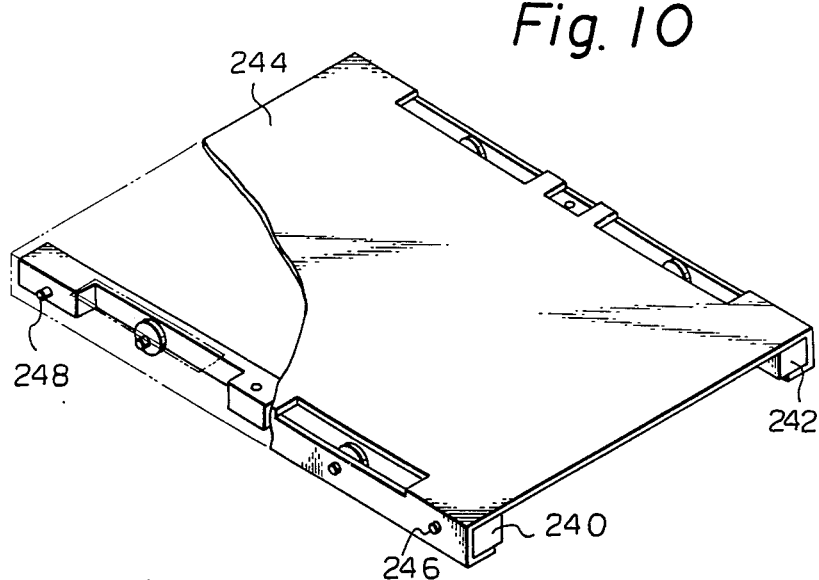
FIG. 10 is a partly taken away perspective view of a sensing member which is included in the device of FIG. 7.
Figure 11:
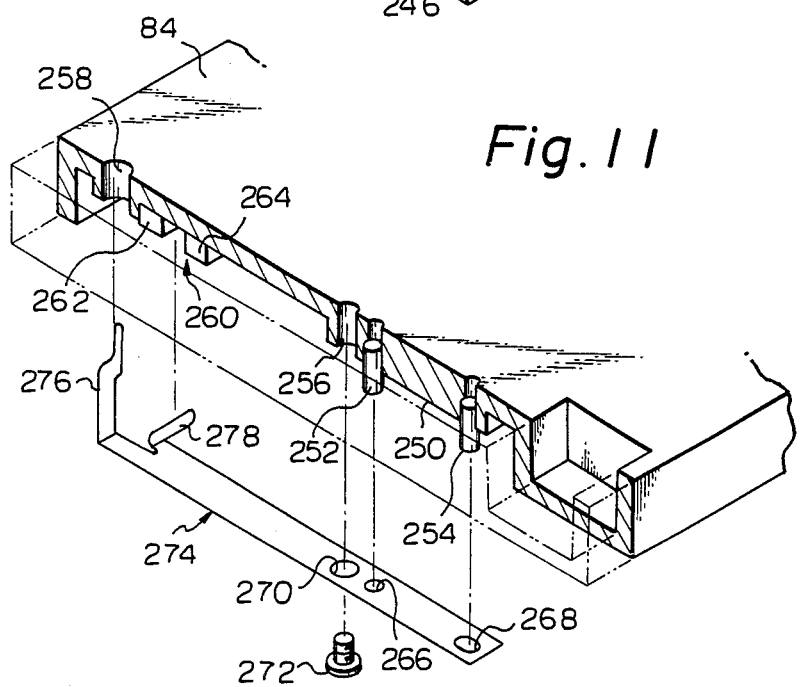
FIG. 11 is an exploded perspective view showing a mounting structure of the sensing member in the device of FIG. 7.

In the illustrative embodiment, the frame portion 124 and guide arms 128 and 130 of the media guide 88 are formed integrally with each other. Alternatively, the frame portion and the opposite guide arms may be provided as separate members as shown in FIG. 10 by way of example. Further, in the illustrative embodiment, the media guide 88 is fixed to the frame 86 by mating the shaped free ends 152 and 154 of the guide arms 128 and 130 respectively with the front openings 106 and 108 of the frame 86. If desired, however, projections provided on right and left media guides 240 and 242 may be mated with openings which are formed through a frame 244, in which case the tips of the lugs may be thermally deformed to fix the media guides 240 and 242 in place.

In the floppy disk driving device described above, each of the device A and the disk cartridge B is provided with an accidental careless erasure preventing mechanism. First, concerning the device A, the base member 84 includes a stepped portion 250 which protrudes from a rearward portion of the back of the base member 84 with respect to the direction of cartridge insertion and in a position adjacent to the right end as viewed in the drawing. The stepped portion 250 is provided with two guide pins 252 and 254 and a single threaded through bore 256. A sensor 260 is mounted in the vicinity of the through bore 258 which is positioned in a left portion in the drawing. As shown, the sensor 260 comprises a light-emitting element and a light-sensitive element which are mounted in a pair of opposing portions 262 and 264, respectively. A sensing member 274 is fixed to the stepped portion 250 by inserting the guide pins 252 and 254 respectively in a guide hole 266 and a guide slot 268 of the member 274 and, then, driving a screw 272 into the threaded bore 256 through an opening 270 of the member 274. As part of a single leaf spring member, the sensing member 274 includes a sensing portion 276 at the free end and a shutter portion 278 adjacent to the sensing portion 276. Specifically, the sensing portion 276 is formed by bending the free end of the leaf spring vertically upwardly, and the shutter portion 278 by bending a portion of the leaf spring adjacent to the free end upwardly and, then, forwardly. The sensing member 274 is located such that the sensing portion 276 extends upward throughout the bore 258 beyond the surface of the base member 84, while the shutter portion 278 is positioned between the opposing portions 262 and 264 of the sensor 260. In this condition, the shutter portion 278 does not interfere with the optical path between the light-emitting element and the light-sensitive element of the sensor 260.

Figure 12A:
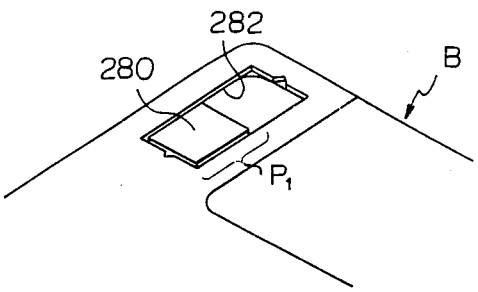
FIGS. 12A and 12B are perspective views showing a switch member and its associated part of a disk cartridge.
Figure 12B:
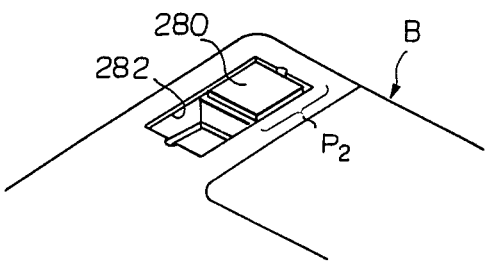
Figure 13:
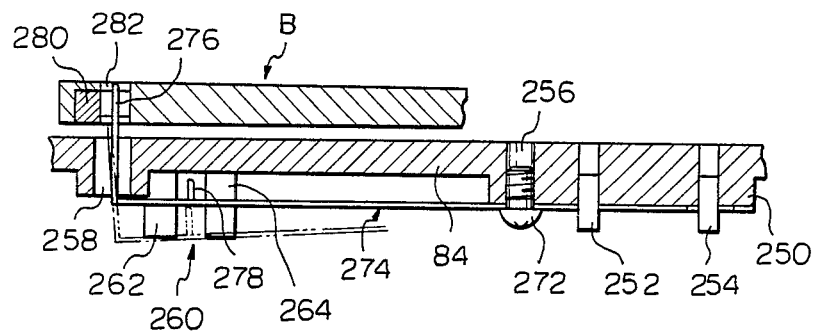
FIG. 13 is a vertical section of the careless erasure preventing mechanism of FIGS. 12A and 12B taken along the length of the sensing member.

Meanwhile, as shown in FIG. 12A, the disk cartridge B is provided with a switch member 280 in a left rear portion of its back in the position illustrated in FIG. 7. The switch member 280 is movable within a window 282 between an erasable position $P_1$ shown in FIG. 12A and an unerasable position $P_2$ shown in FIG. 12B. When the disk cartridge B is inserted into the device A with the switch member 280 held in the erasable position $P_1$, the switch member 280 abuts against the sensing portion 276 of the sensing member 274 and, thereby, flexes the sensing member 274 as indicated by a phantom line in FIG. 13, with the result that the shutter potion 278 optically isolates the light-emitting element and the light-sensitive element of the sensor 260 from each other. In this condition, information is allowed to be written into the floppy disk. If the switch member 280 is in the unerasable position $P_2$, on the other hand, the sensing portion 276 of the sensing member 274 enters the window 282 as indicated by a solid line in FIG. 13, maintaining the optical path between the coactive elements unintercepted. In this condition, writing of information into the floppy disk is inhibited.

While the sensing portion 276 and shutter portion 278 of the sensing member 274 have each been shown and described as extending upwardly, they may alternatively be shaped to extend in any other direction, e.g. downwardly. Also, the position of the sensing member 274 which is on the back of the base member 84 in the illustrative embodiment is not restrictive.

The illustrative embodiment utilizes the thicknesswise movement of the disk cartridge B in sensing a position of the switch member 280. Alternatively, a sensing member may be positioned upright on the base member 84 in order to sense a position of the switch member 280 utilizing a movement which occurs in the cartridge insertion direction.

While recording of information into the floppy disk has been shown and described as being inhibited when the shutter portion 278 does not intervene between the opposing portions 262 and 264, an arrangement may be so made as to inhibit it when the shutter portion 278 intervenes between the opposing portions 262 and 264. Further, the photosensor may be of a reflection type, instead of the transmission type shown and described.

Next, the belt mounting structure in accordance with the present invention will be described in detail.

Figure 14:
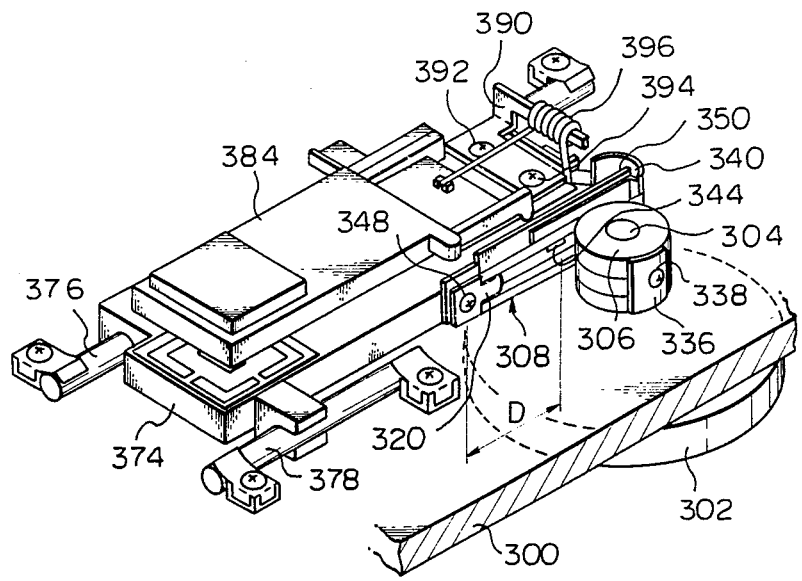
FIG. 14 is a perspective view of a motion converting device having a belt mounting structure in accordance with the present invention which is applied to a floppy disk driving device.

Referring to FIG. 14, there is shown a motion converting device having a belt mounting structure of the present invention which is installed in, for example, a floppy disk driving device. As shown, the device includes a base member 300 on which mechanisms for loading, unloading and driving a floppy disk are arranged. A stepping motor 302 is mounted on the underside of the base member 300. An output shaft of the stepping motor 302 extends throughout the base member 300 to protrude from the upper surface of the base member 300. A roller 306 is rigidly mounted on the upper end of the motor output shaft 304. A belt 308 is wound around the roller 306.

Figure 15:
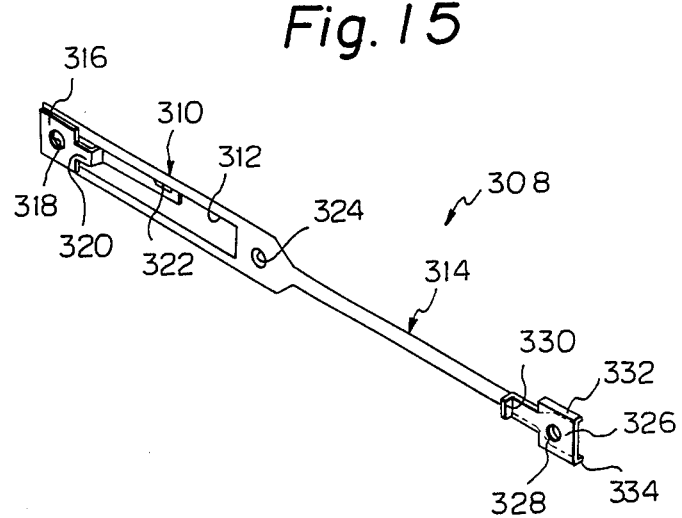
FIG. 15 is a perspective view of a belt included in the motion converting device of FIG. 14.

As shown in FIG. 15, the belt 308 has a comparatively wide portion 310 which is formed with a slot 312 at its intermediate position, and a comparatively narrow portion 314 which extends from one end of the wide portion 310. An attachment 316 is fixed to the outer surface of the free end of the wide portion 310 by adhesive or the like. The attachment 316 and the wide portion 310 overlying each other are formed with an aperture 318. An arm 320 extends from the attachment 316 in the lengthwise direction of the belt 308. The arm 320 is bent in a crank configuration to pass through the slot 312 and, then, extended along the slot 312 at the other side of the belt 308. The arm 320 is formed with an aperture 322 at its free end, while the belt 308 is formed with an aperture 324 at its intermediate position. An attachment 326 is fixed to the outer surface of the free end of the narrow portion 314 by adhesive or the like. The attachment 326 and the narrow portion 314 overlying each other are formed with an aperture 328. The attachment 326 is perpendicularly raised at its end adjacent to the wide portion 310 to form a tongue 330, while being bent toward the other surface at opposite sides thereof to form tongues 332 and 334. The free end of the narrow portion 314 of the belt 308 is passed through the slot 312 of the wide portion 310 to form a loop and, then, the loop is fit over the outer periphery of the roller 306. Thereafter, a retainer member 336 is placed on the belt 308 and, then, a spring 338 is passed through the retainer member 336 and the aperture 324 to be threaded into the roller 306. As a result, the belt 308 is rigidly connected to the roller 306.

Figure 16:
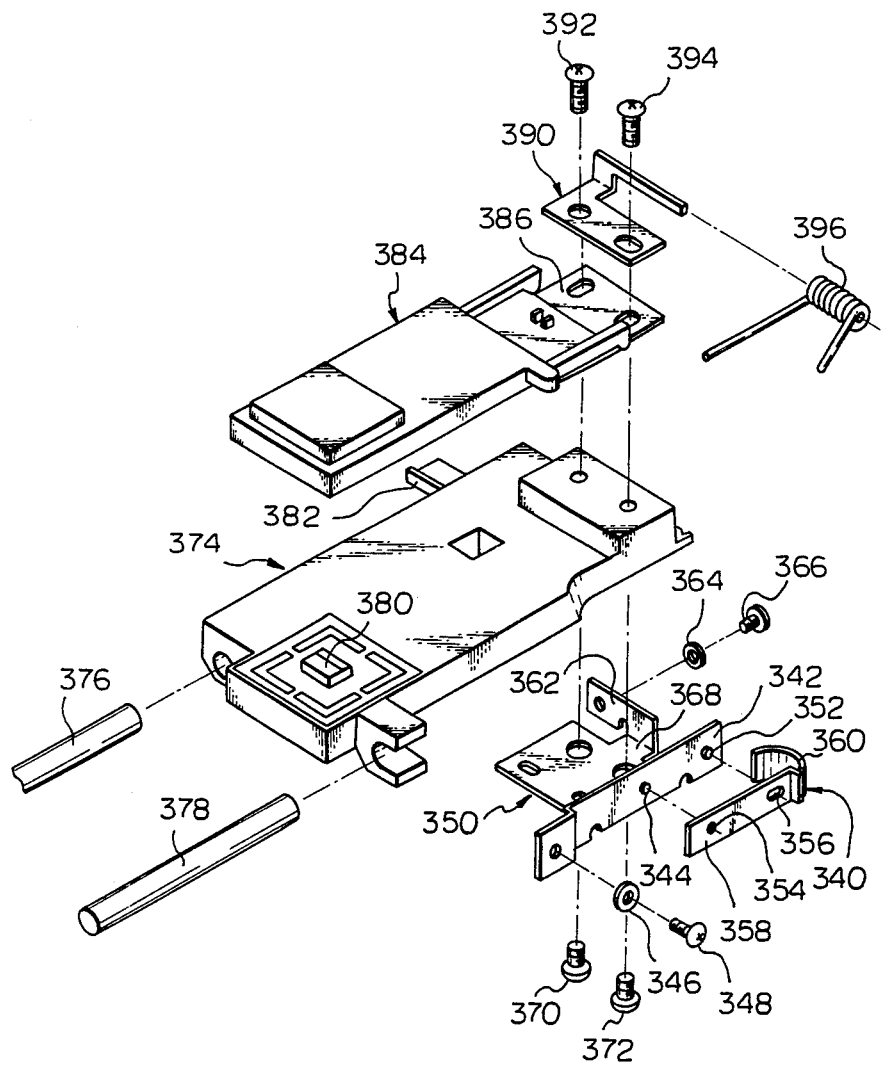
FIG. 16 is an exploded perspective view of the motion converting device of FIG. 14.

As also shown in FIG. 16, at the free end of the belt wide portion 310, the aperture 322 of the arm 320 is mated with a lug 344 of a side piece 342 with the intermediary of a leaf spring 340 and, then, a screw 348 is passed through the aperture 318 through the intermediary of a washer 346 to fasten the belt wide portion 310 to the side piece 342. The side piece 342 rises from a side edge of a mounting plate 350 and has the lug 344 at its outer surface. The slide piece 342 also has another lug 352 on its outer surface which is spaced from the lug 344. The lugs 344 and 352 respectively are mated with an aperture 354 and a slot 356 which are formed through the leaf spring 340. The leaf spring 340 includes a flat portion 358 and a curved resilient portion 360 at which the flat portion 358 terminates. The belt narrow portion 314 is passed over the outer surface of the curved portion 360, while the tongues 332 and 334 of the attachment 326 which is located at the free end of the belt portion 314 are engaged with a rear piece 362. A screw 366 is passed through the aperture 328 with a washer 364 interposed therebetween, thereby fastening the belt narrow portion 314 to the rear piece 362. As shown, the rear piece 362 rises from the rear end of the mounting plate 350 through a comparatively narrow connecting portion 368 and has a transversely long configuration.

The mounting plate 350 is fastened to a slide member 374 by screws 370 and 372. The slide member 374 in turn is slidably supported by guide shafts 376 and 378 on the base member 300. The slide member 374 carries a magnetic head 380 in a front part of its upper surface, and a position sensing arm 382 at a rear part of its side surface. A rotatable member 384 is loaded on the side member 374 and provided with a leaf spring portion 386 at its base end. The leaf spring portion 386 is fastened to the slide member 374 by driving screws 392 and 394 from over an angled member 390. A spring 396 is fit on the angled member 390 in such a manner as to abut against the rear end of the slide member 374 at one end and against the upper surface of the rotatable member 384 at the other end. In this construction, the member 384 is constantly urged by the spring 396 toward the slide member 396 so that a magnetic head (not shown) mounted on the underside of the member 384 is pressed against the magnetic head 380 of the slide member 374. These elements in combination constitute a carriage section.

In the above configuration, the belt 308 is stretched without slackening. As the motor 302 is energized to cause the roller 306 into a reciprocal rotary motion, the rotary motion is transmitted to the slide member 374 by the belt 308 with the result that the slide member 374 is allowed to move reciprocally along a rectilinear path guided by the guide shafts 376 and 378. A floppy disk is held between the slide member 374 and the rotatable member 384 and rotated.

In this particular embodiment, in the event of fastening the belt ends to the slide member 374, rotation of the belt 308 is prevented by the arm 320 of the attachment 316 at the free end of the wide portion 310 and by the tongues 332 and 334 of the attachment 326 at the free end of the narrow portion 314, thereby restraining the belt 308 from twisting motions. Such allows the slide member 374 to move constantly with smoothness and, thereby, ensures high positioning accuracy.

Although the end of the arm 320 and the side member 374 have been shown and described as being engaged with each other by mating the aperture 322 of the arm 320 with the lug 344 of the slide member 374, the arm may be provided with a lug which is to be mated with an aperture or a groove of the slide member. Further, the end of the arm 320 may be provided with tongues similar to those 332 and 334 of the attachment 326, in which case the tongues will be anchored to the slide member.

As described hereinabove, the present invention has various advantageous features as enumerated below.

(1) In a disk driving device, a cartridge holder adapted to accommodate a disk cartridge can be implemented with a significantly small number of structural elements and, therefore, with a minimum of cost. For example, a media guide for guiding a disk cartridge has a right and a left members which are in an integral configuration.

(2) In a cartridge holder for a disk driving device of the type having guide rollers which are each guided by a guide slot, the need for machining for contraction is eliminated as well as the need for expensive metal pins and, therefore, the procedure for fitting the pins. The cartridge holder of the present invention can be readily assembled using a thermal crimping, fitting or like simple technique, which enhances cut-down in cost.

(3) In a disk cartridge loading mechanism for a disk driving device of the type having a cartridge holder in which a disk cartridge is inserted to be loaded in the device, the present invention reduces the number of essential structural elements to promote the ease of assembly and economical construction. Specifically, the mechanism in accordance with the present invention saves a pair of tension springs and four guide plates, compared to the prior art mechanism. Two guide pins provided on a base member enhances smooth movement of the cartridge holder in the vertical direction, while restricting its movement in the vertical direction. Since the cartridge holder is constantly held in a horizontal position by guide slots, smooth movement of the cartridge holder is further enhanced to ensure stable operations. Furthermore, since the cartridge holder in accordance with the present invention is movable vertically but not horizontally, it is needless for the operator to push a cartridge holder together with a disk cartridge otherwise required in the event of inserting the disk cartridge.

(4) In a mechanism associated with a disk driving device which, when a disk cartridge is inserted into the device, writing of information into a disk of the cartridge is inhibited when sensed the cartridge being in an unerasable position by means of a sensing mechanism which is built in the device, and the sensing mechanism is implemented with only a small number of member of members such as a single sensing member and a screw for mounting the sensing member to the device, that is, such eliminates the need for a guide shaft, compression spring, E-ring and others which are essential in the prior art mechanism. Such enhances efficient assembly and economical construction.

(5) In a motion conversion arrangement for converting a reciprocal rotary motion of a motor-driven roller to a reciprocal rectilinear motion of a slidable member through a belt which is passed over the roller, the present invention allows the arm to be fixed to the slide member in an accurate position without being twisted even when screws are driven therethrough. This is because an arm which extends from an end of the belt is engaged at its one end with the slide member and rotation of the belt is restricted at a position spaced a substantial distance from the position where the belt is fastened to the slide member. In addition, since the arm extends along an elongate slot formed through the belt, is bent to accommodate the roller, and is engaged with the slide member at its end, the belt requires only a minimal amount of mounting space and, therefore, desirably meets the demand for a smaller device configuration.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A disk driving device for causing information to be written into and read out of a disk cartridge when the disk cartridge is loaded in a body of the device, comprising:

a cartridge holder having a cartridge guide member made of resin and having a plurality of openings formed therein and a frame wherein first and second guide rollers are provided at each of opposite sides of said guide member for admitting the guide member into said frame with said guide member being fixed within the plane of said frame;

a base member of said body;

a plurality of guide pins positioned on said base member and which respectively are received in said openings of said guide member;

a slide plate mounted on said base and having means for biasing said slide plate in a direction opposite an intended direction of insertion of the disk cartridge, said slide plate having guide slots formed in said slide plate at opposite sides thereof and in which the rollers are engaged in one-to-one correspondence for supporting said frame and guide members, each of said guide slots having a first portion positioned a predetermined distance from said base member and from side portions of said cartridge holder, a second portion positioned upstream of said first portion with respect to a direction of insertion of the disk cartridge and positioned between said first portion and said base member, and a slanted member connecting said first and second portions to each other whereby respective movement of said guide member and said slide plate permits proper registration of said guide member and said slide plate for operation upon insertion of said disk cartridge; and a latch provided on the base member such that, upon movement of said slide base in the direction of insertion of the disk cartridge, the slide plate is latched to prevent the slide plate from return movement opposite said direction of insertion and, when the disk cartridge is inserted into the cartridge holder, the slide plate is unlatched.

2. A disk driving device as claimed in claim 1, wherein the frame is formed with two openings at each of opposite sides thereof, and wherein said guide member is mounted to opposite sides of said frame and provided with a plurality of outwardly extending lugs at outer surfaces of said guide member over which the guide rollers respectively are engaged, the disk cartridge being guided between the frame and the guide member.

3. A disk driving device as claimed in claim 2, wherein the guide member comprises a guide frame portion formed with a slot for the insertion of the disk cartridge and a plurality of guide arms extending from opposite ends of said guide frame portion, said guide frame portion and said guide arms being molded integrally with each other and comprising the same plastic material, the guide rollers being mounted on outer surfaces of the guide arms.

* * * * *